United States Patent
Li

(10) Patent No.: US 10,705,649 B2
(45) Date of Patent: Jul. 7, 2020

(54) PRESSURE TOUCH CONTROL METHOD AND ELECTRONIC DEVICE

(71) Applicant: Huawei Technologies Co., Ltd., Shenzhen (CN)

(72) Inventor: Tongjun Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 16/026,740

(22) Filed: Jul. 3, 2018

(65) Prior Publication Data
US 2018/0314383 A1 Nov. 1, 2018

Related U.S. Application Data

(63) Continuation of application No. PCT/CN2017/073987, filed on Feb. 17, 2017.

(30) Foreign Application Priority Data

Feb. 29, 2016 (CN) .......................... 2016 1 0116713

(51) Int. Cl.
*G06F 3/041* (2006.01)
*G06F 3/044* (2006.01)

(52) U.S. Cl.
CPC ............ *G06F 3/0416* (2013.01); *G06F 3/041* (2013.01); *G06F 3/0412* (2013.01); *G06F 3/044* (2013.01); *G06F 2203/04104* (2013.01)

(58) Field of Classification Search
CPC ...... G06F 3/0416; G06F 3/041; G06F 3/0412; G06F 2203/04104; G06F 3/044
See application file for complete search history.

(56) References Cited

U.S. PATENT DOCUMENTS

| 10,007,333 | B2 * | 6/2018 | Fateh ..................... G06F 3/147 |
| 10,007,342 | B2 * | 6/2018 | Lisseman ................ B62D 1/04 |
| 10,031,583 | B2 * | 7/2018 | Levesque ............... G06F 3/016 |
| 10,037,105 | B2 * | 7/2018 | Wang .................... G06F 3/0488 |
| 2008/0136790 | A1 | 6/2008 | Hio |
| 2010/0317410 | A1 | 12/2010 | Song et al. |
| 2012/0105358 | A1 | 5/2012 | Momeyer et al. |

(Continued)

FOREIGN PATENT DOCUMENTS

| CN | 101202866 A | 6/2008 |
| CN | 102981622 A | 3/2013 |

(Continued)

OTHER PUBLICATIONS

Machine Translation and Abstract of Chinese Publication No. CN101202866, Jun. 18, 2008, 21 pages.

(Continued)

*Primary Examiner* — Chad M Dicke
(74) *Attorney, Agent, or Firm* — Conley Rose, P.C.

(57) ABSTRACT

A pressure touch control method and an electronic device to improve device operation efficiency, where the method includes receiving multiple touch control operations on a same location region on a touchscreen, and determining, according to touch control information of the touch control operations, a display element corresponding to each of the touch control operations, where the touch control information includes pressure value information and pressure duration information.

15 Claims, 3 Drawing Sheets

(56) References Cited

U.S. PATENT DOCUMENTS

2014/0173485 A1    6/2014  Ju et al.
2015/0084737 A1*   3/2015  Li ..................... G07C 9/00134
                                                    340/5.51
2017/0108857 A1*   4/2017  Line ..................... B64C 39/024

FOREIGN PATENT DOCUMENTS

| CN | 103389871 A | 11/2013 |
| CN | 105159530 A | 12/2015 |
| EP | 2911038 A1  | 8/2015  |

OTHER PUBLICATIONS

Foreign Communication From a Counterpart Application, Chinese Application No. 201610116713.3, Chinese Office Action dated Feb. 27, 2019, 6 pages.
Foreign Communication From a Counterpart Application, European Application No. 17759135.1, Extended European Search Report dated Nov. 7, 2018, 11 pages.
Machine Translation and Abstract of Chinese Publication No. CN102981622, Mar. 20, 2013, 9 pages.
Machine Translation and Abstract of Chinese Publication No. CN103389871, Nov. 13, 2013, 34 pages.
Machine Translation and Abstract of Chinese Publication No. CN105159530, Dec. 16, 2015, 22 pages.
Foreign Communication From a Counterpart Application, PCT Application No. PCT/CN2017/073987, English Translation of International Search Report dated May 19, 2017, 2 pages.

* cited by examiner

PRESSURE TOUCH CONTROL METHOD AND ELECTRONIC DEVICE

CROSS-REFERENCE TO RELATED APPLICATIONS

This application is a continuation of International Patent Application No. PCT/CN2017/073987 filed on Feb. 17, 2017, which claims priority to Chinese Patent Application No. 201610116713.3 filed on Feb. 29, 2016. The disclosures of the aforementioned applications are hereby incorporated by reference in their entireties.

TECHNICAL FIELD

The present disclosure relates to the field of computer technologies, and in particular, to a pressure touch control method and an electronic device.

BACKGROUND

Currently, devices such as mobile phones and tablet computers (for example, IPAD) having touchscreens have already been relatively popularized, and a user can enter information by performing operations on touchscreens of these devices by directly using a hand. This operation manner is relatively convenient such that these devices can better adapt to requirements of users of different ages.

When intending to implement a function on a device, a user usually needs to perform an operation on a touchscreen of the device. For example, when intending to invoke an application, the user may tap an icon of the application on the touchscreen. Alternatively, for example, when intending to adjust screen brightness, the user may operate, on the touchscreen, a control used for screen brightness adjustment. That is, before performing any operation, the user needs to first find a corresponding control on the touchscreen, and then perform the operation. Obviously, a relatively long time is consumed, and the operation efficiency is relatively low.

SUMMARY

Embodiments of the present disclosure provide a pressure touch control method and an electronic device to improve device operation efficiency.

According to a first aspect, a first pressure touch control method is provided. The method may be applied to an electronic device having a touchscreen. The method may include receiving multiple touch control operations on a same location region on the touchscreen, and determining, according to touch control information of the multiple touch control operations, a display element corresponding to each of the multiple touch control operations, where the touch control information includes pressure value information and pressure duration information.

Optionally, the location region may be any location region on the touchscreen, or may be a preset location region. For example, a user usually holds a mobile phone in the right hand, and if a touchscreen of the mobile phone is relatively large, a region that is conveniently touched by the user using the single hand is a region in the lower right corner of the touchscreen. In this case, the region in the lower right corner of the touchscreen may be preset to a region that may be used for receiving a touch control operation in this embodiment of the present disclosure. In addition, the location region in this embodiment of the present disclosure may be, for example, a region whose area is relatively large such that the user can conveniently perform an operation. For example, the location region may be a region in any shape, for example, may be a sector region whose center is the lower right corner, or may be a rectangular region whose center is a point in the lower right corner, or the like. For example, an area of the location region may be determined according to a location of the location region on the touchscreen and/or a shape of the location region, or the like, or the location region in this embodiment of the present disclosure may be a touch control point such that the user may conveniently perform some normal operations in another region.

In this embodiment of the present disclosure, when the user performs multiple touch control operations on a same location region on the touchscreen, the multiple touch control operations may correspond to different display elements. That is, when the user performs the operations at a same location, different display elements may be located such that the user may subsequently perform an operation on the different display elements. In this way, the user may select different display elements by performing the operations on one location region, and the user does not need to first find a corresponding display element on the touchscreen and then perform an operation. As long as pressure value information is different and pressure duration information is different when the user performs a touch control operation, the electronic device may respond differently, improving the operation efficiency, and reducing burden of the user. For example, when holding the electronic device in a single hand, the user needs only to perform a touch control operation in a location on the touchscreen of the electronic device using the hand in which the electronic device is held, to select a needed display element without performing an operation using both hands such that an operation process of the user is simpler and more convenient.

With reference to the first aspect, in a first possible implementation of the first aspect, the method further includes executing a control instruction corresponding to a display element corresponding to the first touch control operation in response to a first touch control operation of the multiple touch control operations, or executing a control instruction corresponding to the display element after determining a display element corresponding to a first touch control operation of the multiple touch control operations and in response to another touch control operation.

That is, in response to a touch control operation, the electronic device can directly execute a control instruction corresponding to a corresponding display element. Therefore, the user does not need to perform excessive operations, and the burden of the user is further reduced. Alternatively, in response to a touch control operation, the electronic device may lock a corresponding display element such that the corresponding display element may be determined by the user. If the user intends to further perform an operation on the display element, the user may continue to perform another touch control operation on the display element to implement a function corresponding to the display element. In this way, the user has relatively enough time to determine whether to perform an operation on the display element, avoiding a misoperation that may subsequently occur.

With reference to the first possible implementation of the first aspect, in a second possible implementation of the first aspect, in a manner, determining a display element corresponding to each touch control operation may include mapping a 2-tuple including pressure value information and pressure duration information of the touch control operation to obtain two-dimensional coordinates, and determining that a display element in a location that is indicated by the obtained two-dimensional coordinates on the touchscreen is the display element corresponding to the touch control operation.

A display element determining manner is provided, that is, two-dimensional coordinates on the touchscreen are determined in a mapping manner according to the 2-tuple including the pressure value information and the pressure duration information in order to determine a display element. A display element can be obviously relatively accurately determined using coordinates, and the display element determined in this manner can better reflect a selection requirement of the user.

With reference to the second possible implementation of the first aspect, in a third possible implementation of the first aspect, the 2-tuple including the pressure value information and the pressure duration information may be mapped according to the following formulas, to obtain the two-dimensional coordinates:

$$x=k_1 f+c_1; \text{ and}$$

$$y=k_2 t+c_2,$$

where both $k_1$ and $k_2$ are coefficients of proportionality, both $c_1$ and $c_2$ are constants, x indicates a horizontal coordinate on the touchscreen, y indicates a vertical coordinate on the touchscreen, f indicates a pressure value indicated by the pressure value information or a pressure level to which the pressure value belongs, and t indicates duration indicated by the pressure duration information or a duration level to which the duration belongs. In some implementations, $c_1$ and $c_2$ may be 0.

A mapping manner is provided, and the 2-tuple may be mapped to the two-dimensional coordinates on the touchscreen in this manner such that the display element may be determined.

With reference to any one of the first possible implementation to the third possible implementation of the first aspect, in a fourth possible implementation of the first aspect, before the control instruction is executed, when the display element indicated by the two-dimensional coordinates that are obtained by means of mapping switches, prompt information may be outputted. When the pressure value information and/or the pressure duration information of the touch control operation changes, the two-dimensional coordinates obtained by means of mapping change, and therefore the display element indicated by the two-dimensional coordinates may switch. Optionally, a type of the prompt information is not limited, for example, may include voice prompt information, or may include prompt information used for changing a display effect of the currently indicated display element, or the like.

For each touch control operation, at different moments in a process from operation starting to operation ending, pressure value information and/or pressure duration information may change. Therefore, two-dimensional coordinates obtained according to 2-tuple mapping may also change, and a display element indicated by the two-dimensional coordinates may also switch. In this embodiment of the present disclosure, when a display element switches, the user may be prompted such that the user may learn in a timely manner a display element currently selected, and may learn whether a display element needed by the user is selected. In this way, the user can conveniently perform a subsequent operation. This delivers convenience to the user, and enhances a prompt effect of the electronic device.

According to a second aspect, a second pressure touch control method is provided. The method may be applied to an electronic device having a touchscreen. The method may include receiving a touch control operation on a first location region on the touchscreen, determining, according to touch control information of the touch control operation and a preset correspondence between touch control information and an event, a first event corresponding to the touch control information, and obtaining a control instruction used for performing the first event. The touch control information may include at least one of pressure value information or pressure duration information.

Optionally, the first location region may be any location region on the touchscreen, or may be a preset location region. For example, a user usually holds an electronic device in the right hand, and the first location region may be a preset location region in the lower right corner of the touchscreen. Similar to the first aspect, in this embodiment of the present disclosure, an area, a location, or the like of a location region is not limited.

In this manner, a correspondence between touch control information and an event may be preset. Each touch control operation performed by a user may correspond to different touch control information, a same touch control operation may also correspond to different touch control information in an execution process, and different touch control information may correspond to different events. Therefore, the electronic device may perform different events according to different touch control information, and the user does not need to perform excessive operations. For example, when the user performs a touch control operation in the first location region on the touchscreen, the electronic device can directly determine a corresponding event according to touch control information and the preset correspondence. If the user intends to perform a different event on the electronic device, the user needs only to change pressure information and/or pressure duration information of the touch control operation, and does not need to specially perform an event triggering operation, improving the operation efficiency, and reducing operation burden of the user.

With reference to the second aspect, in a first possible implementation of the second aspect, a possible manner of determining a first event includes determining a shortcut event. On the premise of determining the first event, a possible manner of obtaining a control instruction used for performing the first event includes obtaining a control instruction used for performing the shortcut event.

Events corresponding to the touch control information may be different events. For example, the touch control information may correspond to different shortcut events. For example, the shortcut event may include a shortcut key event, such as an event of calling a preset contact person using a shortcut key, an event of sending information to a preset contact person using a shortcut key, or the like. For example, the user may implement an alarm function in this manner. For example, when the user encounters a danger, there may be insufficient time for directly making a call, and it may be inconvenient to search for a shortcut key and excessive operations are required. In this case, the user needs only to perform a touch control operation, and then the electronic device may implement a function similar to the shortcut key, for example, may automatically send help seeking information to the preset contact person. In this way, the alarm function may be implemented in a relatively simple manner, enriching capabilities of the electronic device.

With reference to the second aspect, in a second possible implementation of the second aspect, a possible manner of determining a first event includes determining an input event corresponding to a first character code corresponding to a first character on a virtual input device displayed on the touchscreen. On the premise of determining the first event, a possible manner of obtaining a control instruction used for performing the first event includes obtaining a control instruction used for entering the first character indicated by the first character code.

Events corresponding to the touch control information may be different events, for example, may be events used for entering characters indicated by different character codes. For example, the virtual input device is displayed on the touchscreen, for example, may be a virtual keyboard. The virtual keyboard includes different characters, and each character corresponds to a character code. Therefore, different events corresponding to different information may be used for entering different characters, and the user does not need to use a hand to press character keys on the virtual keyboard. In particular, when an area of the touchscreen of the electronic device is relatively large, the user can conveniently perform an operation in this manner.

With reference to the second aspect, in a third possible implementation of the second aspect, a possible manner of the determining a first event includes determining an adjustment event in which an adjustment length is a first length. On the premise of determining the first event, a possible manner of obtaining a control instruction used for performing the first event includes obtaining a control instruction used for adjusting, according to the first length, a progress bar displayed on the touchscreen, or obtaining a control instruction used for turning, according to the first length, pages of a document displayed on the touchscreen.

Events corresponding to the touch control information may be different events. In this possible implementation, different touch control information may correspond to events used for adjusting different lengths. Then, a corresponding adjustment length may be determined according to an event corresponding to the touch control information, that is, the first length may be determined. Then, the progress bar may be adjusted according to the adjustment length, or pages of a document may be turned, and the user does not need to manually perform an operation. In addition, if the user performs adjustment by performing a manual operation, manual locating is usually not accurate enough, and it may be relatively difficult to adjust to a location that the user feels just appropriate. However, when adjustment is performed using a device, locating is usually relatively accurate such that an adjustment result better satisfies a requirement of the user.

With reference to the second aspect, in a fourth possible implementation of the second aspect, a possible manner of determining a first event includes determining, according to the touch control information of the touch control operation and the preset correspondence between touch control information and an event, an adjustment event in which an adjustment length is a first length, and determining that an adjustment direction in the adjustment event is a first direction indicated by the pressure value information. On the premise of determining the first event, a possible manner of obtaining a control instruction used for performing the first event includes obtaining a control instruction used for adjusting, according to the first length and the first direction, a progress bar displayed on the touchscreen, or obtaining a control instruction used for turning, according to the first length and the first direction, pages of a document displayed on the touchscreen.

Usually, during adjustment of a progress of a control, there are two adjustment directions. For example, for a control used for adjusting a volume, the volume may be turned up, or the volume may be turned down. In this case, in this embodiment of the present disclosure, it may be determined according to touch control information that an event is an adjustment event used for adjusting a length. In addition, an operation direction of a touch control operation may be further determined according to pressure information. Therefore, the operation direction of the touch control operation may be determined as an adjustment direction, and adjustment is performed according to the adjustment direction and the first length such that an adjustment process better satisfies a requirement of the user, and an adjustment result is more accurate.

Optionally, if the touch control operation is a sliding touch control operation, that is, in addition to a pressure value, the pressure value information may be used for indicating a sliding track, a direction indicated by the sliding track of the touch control operation may be directly determined as an adjustment direction. If the touch control operation is a pressing operation, that is, no sliding is performed when the user performs the touch control operation, the touch control operation has no sliding track. In this case, a direction indicated by the touch control operation may be determined by analyzing pressure values of points in a region on which an operating body touches the touchscreen during the touch control operation. That is, no matter whether the touch control operation is a movement operation, the direction indicated by the touch control operation may be obtained by analyzing the touch control information such that an adjustment result may be more accurate.

According to a third aspect, a first type of electronic device having a touchscreen is provided, where the electronic device may include the touchscreen and a processor. The touchscreen may be configured to receive multiple touch control operations on a same location region, and send operation information of the multiple touch control operations to the processor included in the electronic device. The processor may be configured to determine, according to the received touch control information of the multiple touch control operations that is sent by the touchscreen, a display element corresponding to each of the multiple touch control operations, where the touch control information includes pressure value information and pressure duration information.

With reference to the third aspect, in a first possible implementation of the third aspect, the processor may be further configured to execute a control instruction corresponding to a display element corresponding to the first touch control operation in response to a first touch control operation of the multiple touch control operations, or execute a control instruction corresponding to the display element after determining a display element corresponding to a first touch control operation of the multiple touch control operations, in response to another touch control operation.

With reference to the first possible implementation of the third aspect, in a second possible implementation of the third aspect, the processor is configured to determine the display element corresponding to each touch control operation, and the process may include mapping a 2-tuple including pressure value information and pressure duration information of the touch control operation to obtain two-dimensional coordinates, and determining that a display element in a location that is indicated by the obtained two-dimensional coordinates on the touchscreen is the display element corresponding to the touch control operation.

With reference to the second possible implementation of the third aspect, in a third possible implementation of the third aspect, the processor is configured to map the 2-tuple including pressure value information and pressure duration information of the touch control operation to obtain the two-dimensional coordinates, and the process may include mapping, according to the following formulas, the 2-tuple including the pressure value information and the pressure duration information to obtain the two-dimensional coordinates:

$$x=k_1f+c_1; \text{ and}$$

$$y=k_2t+c_2,$$

where both $k_1$ and $k_2$ are coefficients of proportionality, both $c_1$ and $c_2$ are constants, x indicates a horizontal coordinate on the touchscreen, y indicates a vertical coordinate on the touchscreen, f indicates a pressure value indicated by the pressure value information or a pressure level to which the pressure value belongs, and t indicates duration indicated by the pressure duration information or a duration level to which the duration belongs.

With reference to the first possible implementation, the second possible implementation, or the third possible implementation of the third aspect, in a fourth possible implementation of the third aspect, before executing the control instruction, if the display element indicated by the two-dimensional coordinates that are obtained by means of mapping switches, the processor may be further configured to output prompt information. When the pressure value information and/or the pressure duration information of the touch control operation changes, the two-dimensional coordinates obtained by means of mapping change.

According to a fourth aspect, a second type of electronic device having a touchscreen is provided, where the electronic device may include the touchscreen and a processor. The touchscreen may be configured to receive a touch control operation on a first location region on the touchscreen, and send touch control information of the touch control operation to the processor included in the electronic device. The processor may be configured to determine, according to the received touch control information of the touch control operation that is sent by the touchscreen and a preset correspondence between touch control information and an event, a first event corresponding to the touch control information, and obtain a control instruction used for performing the first event. The touch control information includes at least one of pressure value information or pressure duration information.

With reference to the fourth aspect, in a first possible implementation of the fourth aspect, the processor may be configured to determine the first event, and the process may include determining a shortcut event. In addition, the processor may be configured to obtain a control instruction used for performing the first event, and the process may include obtaining a control instruction used for performing the shortcut event.

With reference to the fourth aspect, in a second possible implementation of the fourth aspect, the processor may be configured to determine the first event, and the process may include determining an input event corresponding to a first character code corresponding to a first character on a virtual input device displayed on the touchscreen. In addition, the processor may be configured to obtain a control instruction used for performing the first event, and the process may include obtaining a control instruction used for entering the first character indicated by the first character code.

With reference to the fourth aspect, in a third possible implementation of the fourth aspect, the processor may be configured to determine the first event, and the process may include determining an adjustment event in which an adjustment length is a first length. In addition, the processor may be configured to obtain the control instruction used for performing the first event, and the process may include obtaining a control instruction used for adjusting, according to the first length, a progress bar displayed on the touchscreen, or obtaining a control instruction used for turning, according to the first length, pages of a document displayed on the touchscreen.

With reference to the fourth aspect, in a fourth possible implementation of the fourth aspect, the processor may be configured to determine the first event according to the received touch control information of the touch control operation that is sent by the touchscreen and a preset correspondence between touch control information and an event, and the process may include determining, according to the received touch control information of the touch control operation that is sent by the touchscreen and the preset correspondence between touch control information and an event, the adjustment event in which an adjustment length is the first length, and determining that an adjustment direction in the adjustment event is a first direction indicated by the pressure value information. In addition, the processor may be configured to obtain the control instruction used for performing the first event, and the process may include obtaining a control instruction used for adjusting, according to the first length and the first direction, a progress bar displayed on the touchscreen, or obtaining a control instruction used for turning, according to the first length and the first direction, pages of a document displayed on the touchscreen.

According to a fifth aspect, a third type of electronic device is provided, where the electronic device may include a memory, a touchscreen, and a processor. The memory may be configured to store an instruction needed by the processor to perform a task. The touchscreen may be configured to receive multiple touch control operations on a same location region, and send operation information of the multiple touch control operations to the processor included in the electronic device. The processor may be configured to execute the instruction stored in the memory in order to determine, according to the received touch control information of the multiple touch control operations that is sent by the touchscreen, a display element corresponding to each of the multiple touch control operations, where the touch control information includes pressure value information and pressure duration information.

With reference to the fifth aspect, in a first possible implementation of the fifth aspect, the processor may be further configured to execute the instruction stored in the memory in order to execute a control instruction corresponding to a display element corresponding to the first touch control operation in response to a first touch control operation of the multiple touch control operations, or execute a control instruction corresponding to the display element after determining a display element corresponding to a first touch control operation of the multiple touch control operations, in response to another touch control operation.

With reference to the first possible implementation of the fifth aspect, in a second possible implementation of the fifth aspect, the processor is configured to determine the display element corresponding to each touch control operation, and the process may include mapping a 2-tuple including pressure value information and pressure duration information of the touch control operation, to obtain two-dimensional coordinates, and determining that a display element in a location that is indicated by the obtained two-dimensional coordinates on the touchscreen is the display element corresponding to the touch control operation.

With reference to the second possible implementation of the fifth aspect, in a third possible implementation of the fifth aspect, the processor is configured to map the 2-tuple including the pressure value information and the pressure duration information of the touch control operation, to obtain the two-dimensional coordinates, and the process may include mapping, according to the following formulas, the 2-tuple including the pressure value information and the pressure duration information, to obtain the two-dimensional coordinates:

$$x = k_1 f + c_1; \text{ and}$$

$$y = k_2 t + c_2,$$

where both $k_1$ and $k_2$ are coefficients of proportionality, both $c_1$ and $c_2$ are constants, x indicates a horizontal coordinate on the touchscreen, y indicates a vertical coordinate on the touchscreen, f indicates a pressure value indicated by the pressure value information or a pressure level to which the pressure value belongs, and t indicates duration indicated by the pressure duration information or a duration level to which the duration belongs.

With reference to the first possible implementation, the second possible implementation, or the third possible implementation of the fifth aspect, in a fourth possible implementation of the fifth aspect, the processor may be further configured to execute the instruction stored in the memory in order to output prompt information before executing the control instruction, if the display element indicated by the two-dimensional coordinates that are obtained by means of mapping switches. When the pressure value information and/or the pressure duration information of the touch control operation changes, the two-dimensional coordinates obtained by means of mapping change.

According to a sixth aspect, a fourth type of electronic device having a touchscreen is provided, where the electronic device may include a memory, the touchscreen, and a processor. The memory may be configured to store an instruction needed by the processor to perform a task. The touchscreen may be configured to receive a touch control operation on a first location region on the touchscreen, and send touch control information of the touch control operation to the processor included in the electronic device. The processor may be configured to execute the instruction stored in the memory in order to determine, according to the received touch control information of the touch control operation that is sent by the touchscreen and a preset correspondence between touch control information and an event, the first event corresponding to the touch control information, and obtain a control instruction used for performing the first event. The touch control information includes at least one of pressure value information or pressure duration information.

With reference to the sixth aspect, in a first possible implementation of the sixth aspect, the processor may be configured to determine the first event, and the process may include determining a shortcut event. In addition, the processor may be configured to obtain the control instruction used for performing the first event, and the process may include obtaining a control instruction used for performing the shortcut event.

With reference to the sixth aspect, in a second possible implementation of the sixth aspect, the processor may be configured to determine the first event, and the process may include determining an input event corresponding to a first character code corresponding to a first character on a virtual input device displayed on the touchscreen. In addition, the processor may be configured to obtain the control instruction used for performing the first event, and the process may include obtaining a control instruction used for entering the first character indicated by the first character code.

With reference to the sixth aspect, in a third possible implementation of the sixth aspect, the processor may be configured to determine the first event, and the process may include determining an adjustment event in which an adjustment length is a first length. In addition, the processor may be configured to obtain the control instruction used for performing the first event, and the process may include obtaining a control instruction used for adjusting, according to the first length, a progress bar displayed on the touchscreen, or obtaining a control instruction used for turning, according to the first length, pages of a document displayed on the touchscreen.

With reference to the sixth aspect, in a fourth possible implementation of the sixth aspect, the processor may be configured to determine the first event according to the received touch control information of the touch control operation that is sent by the touchscreen and the preset correspondence between the touch control information and the event, and the process may include determining, according to the received touch control information of the touch control operation that is sent by the touchscreen and the preset correspondence between touch control information and an event, an adjustment event in which an adjustment length is the first length, and determining that an adjustment direction in the adjustment event is a first direction indicated by the pressure value information. In addition, the processor may be configured to obtain the control instruction used for performing the first event, and the process may include obtaining a control instruction used for adjusting, according to the first length and the first direction, a progress bar displayed on the touchscreen, or obtaining a control instruction used for turning, according to the first length and the first direction, pages of a document displayed on the touchscreen.

According to a seventh aspect, a fifth type of electronic device is provided, and the electronic device may include a module configured to execute the method in the first aspect.

According to an eighth aspect, a sixth type of electronic device is provided, and the electronic device may include a module configured to execute the method in the second aspect.

In the embodiments of the present disclosure, a user needs only to perform a touch control operation in a location on a touchscreen to implement a function that the user intends to implement. The user does not need to determine a needed display element and then specially perform an operation on the display element, reducing operation steps of the user, and improving device intelligence.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The following describes some terms in the embodiments of the present disclosure, for ease of understanding by a person skilled in the art.

(1) For example, an electronic device may include a terminal device. The terminal device is a device that provides voice and/or data connectivity for a user. For example, the terminal device may include a hand-held device having a wireless connection function, or a processing device that is connected to a wireless modem. The terminal device may communicate with a core network using a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a mobile apparatus that is portable, pocket-sized, hand-held, built in a computer, or in vehicle. For example, the terminal device may be a device such as a personal communication service (PCS) phone, a cordless telephone set, a Session Initiation Protocol (SIP) phone, a wireless local loop (WLL) station, or a personal digital assistant (PDA).

Certainly, the electronic device in the embodiments of the present disclosure has a touchscreen, for example, may have a capacitive touchscreen, or may have a resistive touchscreen, or may have another type of touchscreen, as long as a user can directly perform an operation on the touchscreen. A type of the touchscreen is not limited in the embodiments of the present disclosure.

(2) In the embodiments of the present disclosure, "multiple" refers to two or more. The term "and/or" describes an association relationship for describing associated objects and represents that three relationships may exist. For example, A and/or B may represent the following three cases, only A exists, both A and B exist, and only B exists. In addition, the character "/" generally indicates an "or" relationship between the associated objects.

The following further describes the embodiments of the present disclosure in detail with reference to this specification.

Figure 1:
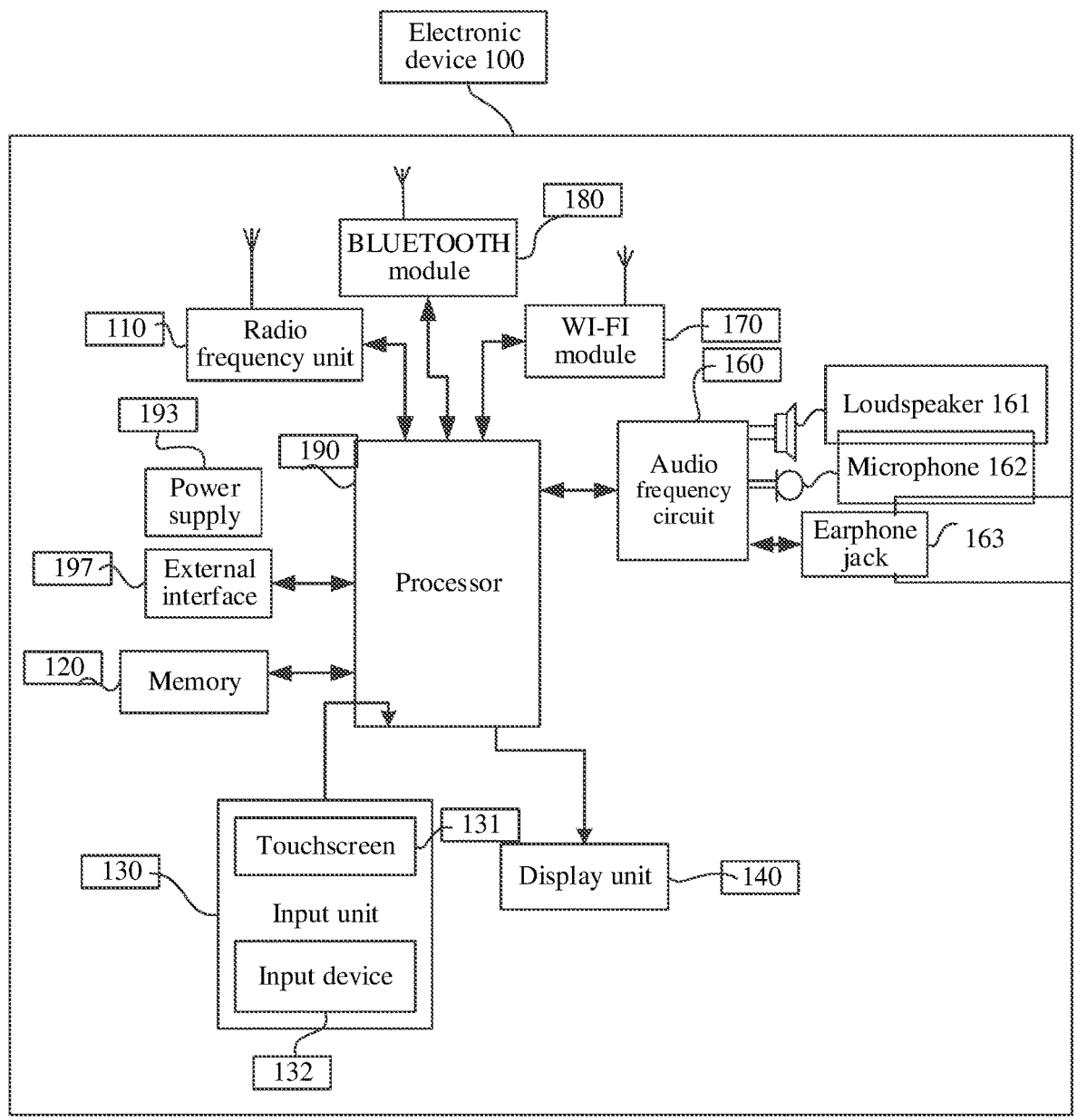
FIG. 1 is a schematic structural diagram of an electronic device according to an embodiment of the present disclosure.

Referring to FIG. 1, an electronic device 100 is provided. For convenience of description, FIG. 1 uses an electronic device 100 that includes a touchscreen 131 as an example for description. A person skilled in the art may understand that, the embodiments in the present disclosure may be applied to other apparatuses, such as a hand-held device, an in-vehicle device, a wearable device, a computing device, or various forms of UE, mobile stations, or terminal devices.

FIG. 1 shows a block diagram of the electronic device 100 that includes a touchscreen 131 in some embodiments. The electronic device 100 may include components such as an input unit 130, a display unit 140, a memory 120, a processor 190, a radio frequency unit 110, an audio frequency circuit 160, a loudspeaker 161, a microphone 162, a WI-FI module 170, a BLUETOOTH module 180, a power supply 193, and an external interface 197.

A person skilled in the art can understand that, FIG. 1 is only an example of the electronic device, and does not constitute any limitation on the electronic device. The electronic device may include more or fewer components than those shown in the figure, or a combination of some components, or different components.

The input unit 130 may be configured to receive entered digit or character information, and generate a key signal input related to user setting and function control of the electronic device. For example, the input unit 130 may include a touchscreen 131 and an input device 132. The touchscreen 131 may collect a touch operation performed by a user on or near the touchscreen 131 (for example, an operation performed by the user using a finger, a joint, a stylus, or any suitable object on or near the touchscreen 131), and drive a corresponding connected device according to a preset program. The touchscreen 131 may detect a touch control operation performed by the user on the touchscreen 131, and convert the touch control operation into a touch control signal and send the touch control signal to the processor 190. Alternatively, it is understood that the touchscreen 131 may send touch control information of the touch control operation to the processor 190, and can receive a command sent by the processor 190 and execute the command. The touch control information may include at least one of pressure information or pressure duration information. The touchscreen 131 may provide an input interface and an output interface between the electronic device 100 and the user. In addition, the touchscreen 131 may be implemented in various types such as a resistive type, a capacitive type, an infrared type, and a surface acoustic wave type. In addition to the touchscreen 131, the input unit 130 may further include the other input device 132. For example, the other input device 132 may include but is not limited to one or more of a physical keyboard, a function key (for example, a volume control key or a switch key), a track ball, a mouse, a joystick, or the like.

The display unit 140 may be configured to display information entered by the user or information provided for the user and various menus of the electronic device 100. Further, the touchscreen 131 may cover the display unit 140. After the touch unit 131 detects the touch control operation on or near the touch unit 131, the touch unit 131 transmits information about the touch control operation to the processor 190 to determine a type of a touch control event. Subsequently, the processor 190 provides corresponding visual input on the display unit 140 according to the type of the touch control event. In the embodiments, the touchscreen 131 and the display unit 140 may be integrated into one component to implement input, output, and display functions of the electronic device 100. For convenience of description, in the embodiments of the present disclosure, for example, the touchscreen 131 represents a function set of the touchscreen 131 and the display unit 140. Certainly, in some embodiments, the touchscreen 131 and the display unit 140 may also be used as two independent components.

The memory 120 may be configured to store an instruction and data, and the memory 120 may mainly include an instruction storage region and a data storage region. The data storage region may store an association relationship between a joint touch gesture and an application program function. The instruction storage region may store an operating system, an instruction needed by at least one function, or the like. The instruction stored in the memory 120 can enable the processor 190 to execute the methods that are provided in FIG. 2 and FIG. 3 in the following in the embodiments of the present disclosure.

The processor 190 is a control center of the electronic device 100, connects components of an entire mobile phone using various interfaces and lines, and executes, by running or executing the instruction stored in the memory 120 and by invoking the data stored in the memory 120, various functions of the electronic device 100 and data processing, to perform overall monitoring on the electronic device. Optionally, the processor 190 may include one or more processing units. Preferably, the processor 190 may be integrated with an application processor and a modem processor. The application processor mainly processes an operating system, a user interface, an application program, and the like. The modem processor mainly processes wireless communication. It may be understood that the foregoing modem processor may not be integrated into the processor 190. In some embodiments, the processor 190 and the memory 120 may be implemented in a same chip. In some embodiments, they may be separately implemented in independent chips.

The radio frequency unit 110 may be configured to receive and send information or receive and send a signal during a call. Generally, the radio frequency circuit includes but is not limited to an antenna, and at least one of an amplifier, a transceiver, a coupler, a low noise amplifier (LNA), or a duplexer. In addition, the radio frequency module 110 may further communicate with another device using radio communication and a network device. The wireless communication may use any communications standard or protocol, which includes, but is not limited to, a Global System for Mobile Communications (GSM), a general packet radio service (GPRS), Code Division Multiple Access (CDMA), Wideband CDMA (WCDMA), Long Term Evolution (LTE), an electronic mail (e-mail), and a short message service (SMS).

The audio frequency circuit 160, the loudspeaker 161, and the microphone 162 may provide audio interfaces between the user and the electronic device 100. The audio frequency circuit 160 may transmit to the loudspeaker 161, an electrical signal that is obtained after conversion of received audio data, and the loudspeaker 161 converts the electrical signal into a voice signal and outputs the sound signal. In addition, the microphone 162 converts a collected voice signal into an electrical signal, the audio frequency circuit 160 receives and converts the electrical signal into audio data, and outputs the audio data to the processor 190 for processing, and then processed audio data is sent to, for example, another terminal, using the radio frequency circuit 110, or the audio data is output to the memory 120 for further processing. The audio circuit may also include an earphone jack 163 to provide a connection interface between the audio circuit and an earphone.

WI-FI belongs to a short-distance wireless transmission technology. Using the WI-FI module 170, the electronic device 100 can help the user receive and send an e-mail, browse a web page, access streaming media, and the like. The WI-FI module 170 provides wireless access to the broadband Internet for the user. Although FIG. 1 shows the WI-FI module 170, it may be understood that the WI-FI module 170 is not a mandatory constituent of the electronic device 100, and the WI-FI module 170 may be omitted as required without changing the scope of the essence of the present disclosure.

BLUETOOTH is a short-distance wireless communications technology. A BLUETOOTH technology can effectively simplify communication between mobile communications terminals such as a palmtop computer, a notebook computer, and a mobile phone, and can also successfully simplify communication between the devices and the Internet. Using the BLUETOOTH module 180, data transmission between the electronic device 100 and the Internet becomes faster and more efficient, enhancing wireless communication. The BLUETOOTH technology is an open solution that can implement voice and data wireless transmission. Although FIG. 1 shows the WI-FI module 170, it may be understood that, the WI-FI module 170 is not a mandatory constituent of the electronic device 100, and may be omitted as required without changing the scope of the essence of the present disclosure.

The electronic device 100 may further include the power supply 193 (for example, a battery) for supplying power for all the components. Preferably, the power supply may be logically connected to the processor 190 using a power supply management system such that functions such as charging and discharging management and power consumption management are implemented using the power supply management system.

The electronic device 100 may further include the external interface 197. The external interface may include a standard micro universal serial bus (USB) interface or may include a multi-pin connector, and may be configured to connect the electronic device 100 and another device to perform communication, or may be configured to connect a charger and the electronic device 100 for charging.

Although not shown, the electronic device 100 may further include another possible functional module such as a camera or a flash. Details are not described herein.

The electronic device may be configured to execute the methods provided in the embodiments of the present disclosure. The following describes the methods that the electronic devices can execute.

Figure 2:
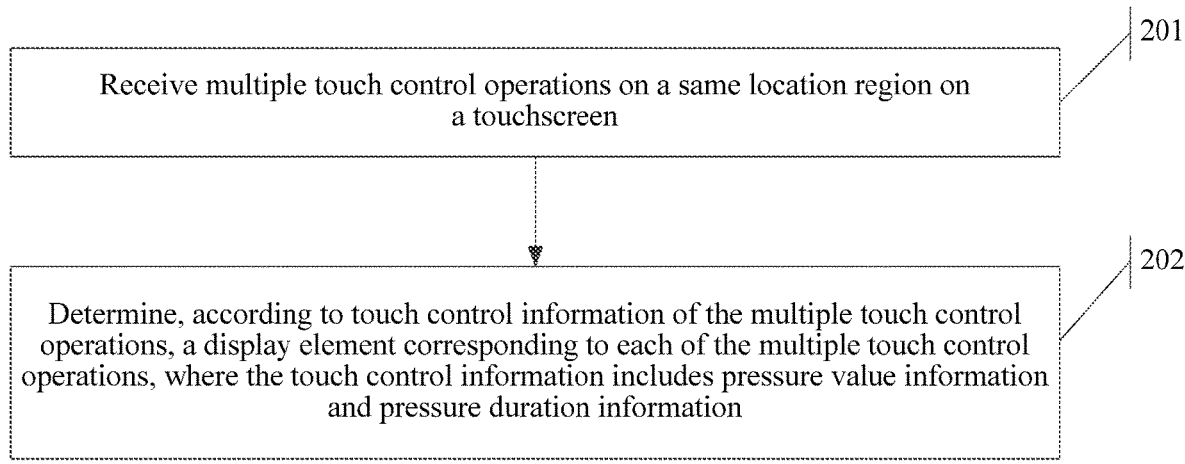
FIG. 2 is a flowchart of a first pressure touch control method according to an embodiment of the present disclosure.

Referring to FIG. 2, a first pressure touch control method is provided. A process of the method is as follows.

Step 201: Receive multiple touch control operations on a same location region on a touchscreen.

Step 202: Determine, according to touch control information of the multiple touch control operations, a display element corresponding to each of the multiple touch control operations, where the touch control information includes pressure value information and pressure duration information.

A user may perform a touch control operation in a location on the touchscreen 131 of the electronic device using an operating body. For example, the operating body may include a finger of the user, or may include a stylus, or may include another possible object.

When the user performs a touch control operation on the touchscreen 131, the touch control operation generates pressure on the touchscreen 131, and the touch control operation also has particular duration. Therefore, when receiving the touch control operation of the user using the touchscreen 131, the electronic device 100 may obtain touch control information of the touch control operation using the touchscreen 131. After obtaining the touch control information, the touchscreen 131 may send the obtained touch control information to a processor 190. For example, the touch control information may include pressure information and pressure duration information. The processor 190 may determine a corresponding display element according to the pressure information and the pressure duration information of the touch control operation. The following describes a possible manner of determining a display element.

Optionally, pressure information may indicate a pressure value. At each moment when a touch control operation has not ended, pressure information of the touch control operation and pressure duration information of the touch control operation may form a 2-tuple. Herein, the pressure information included in the 2-tuple may be a pressure value indicated by the pressure information or a pressure level to which the pressure value belongs. The pressure duration information included in the 2-tuple may be duration indicated by the pressure duration information, or may be a duration level to which the duration belongs.

For example, at a first moment, a user starts to perform a touch control operation. At the first moment, a pressure value of the touch control operation is 0.2 newtons (N), and duration is 0.2 seconds (s). In this case, the 2-tuple is (0.2, 0.2). By mapping the 2-tuple using the processor 190, the electronic device 100 can obtain two-dimensional coordinates on the touchscreen 131. For example, the 2-tuple may be different from a unit on a coordinate system on the touchscreen 131. Therefore, the processor 190 may map the 2-tuple according to a preset proportion to obtain the two-dimensional coordinates on the touchscreen 131. For example, the preset proportion may be set according to a screen resolution of the touchscreen, for example, may be set when the device is delivered, or may be set by the user. For example, the pressure level or the pressure value is represented as f, the duration or the duration level is represented as t, and the two-dimensional coordinates on the touchscreen are represented as (x, y). For example, maximum values corresponding to (f, t) are ($F_m$, $T_m$), and maximum values corresponding to (x, y) are ($X_m$, $Y_m$). Then, x and y may be calculated according to the following formulas, that is, mapping may be performed according to the following formulas:

$$x=k_1f+c_1 \quad (1); \text{ and}$$

$$y=k_2t+c_2 \quad (2),$$

where both $k_1$ and $k_2$ are coefficients of proportionality involved in the preset proportion. For example, $k_1$ may be determined according to $X_m$ and $F_m$, for example, $k_1=X_m/F_m$. For example, $k_2$ may be determined according to $Y_m$ and $T_m$, for example, $k_2=Y_m/T_m$. If the 2-tuple includes the pressure value indicated by the pressure information, $F_m$ may be a possible maximum value of the pressure value. If the 2-tuple includes the pressure level to which the pressure value indicated by the pressure information belongs, $F_m$ may be a possible maximum value of the pressure level. Similarly, if the 2-tuple includes the duration indicated by the pressure duration, $T_m$ may be a possible maximum value of the duration. If the 2-tuple includes the duration level to which the duration indicated by the pressure duration belongs, $T_m$ may be a possible maximum value of the duration level. Both $c_1$ and $c_2$ are constants. For example, $c_1$ may be greater than or equal to 0. Similarly, $c_2$ may also be greater than or equal to 0. A person skilled in the art naturally knows that, the formula (1) and the formula (2) are only an example. A manner of simply modifying the formula (1) and/or the formula (2) for mapping also falls within the protection scope of the present disclosure. For example, changing one or more parameters in the formula (1) and/or the formula (2), or adding one or more parameters to the formula (1) and/or the formula (2), or deleting one or more parameters from the formula (1) and/or the formula (2) falls within the protection scope of the embodiments of the present disclosure.

Optionally, during mapping, full-screen mapping may be performed, or partial-screen mapping may be performed, that is, the 2-tuple may be mapped only to a partial region on the touchscreen, for example, mapped to a display window. In this way, a display element may be determined on a full screen. For example, icons of different applications may be determined. Alternatively, a display element may be determined in a small window. For example, different texts may be determined, different objects in an image may be determined, or the like.

Optionally, values of $F_m$ and $T_m$ may be determined according to a detection capability of hardware, and may also be adjusted in real time after being determined, for example, may be adjusted by the electronic device, or may be adjusted by the user. During full-screen mapping, values of $X_m$ and $Y_m$ may be a length and a width of a current resolution of the touchscreen. During partial mapping, the values of $X_m$ and $Y_m$ may be respectively a length and a width of a small window to be mapped to.

For example, $k_1=X_m/F_m=100$, $k_2=Y_m/T_m=100$, and $c_1=c_2=100$, and then the processor 190 maps a 2-tuple (0.2, 0.2) according to the formula (1) and the formula (2) to obtain coordinates (20, 20). Then, the electronic device determines a location of the coordinates (20, 20) on the touchscreen using the processor 190, and then can determine a display element in the location of the coordinates.

In the foregoing example, the pressure value and the duration of the touch control operation form the 2-tuple. Alternatively, different pressure levels may be preset. For example, the pressure level is set to level 1 when the pressure value is within [0 N, 0.1 N], or the pressure level is set to level 2 when the pressure value is within (0.1 N, 0.2 N]. In this case, the processor 190 may form the 2-tuple using the pressure level and the duration, to obtain the 2-tuple. For example, the pressure value is 0.2 N, and a corresponding pressure level is level 2, and the duration is 0.2 s. In this case, the pressure level and the duration may form a 2-tuple, that is, (2, 0.2).

Alternatively, different duration levels may be preset. For example, the duration level is set to level 1 when the duration is within [0 s, 0.2 s], or the duration level is set to level 2 when the duration is within (0.2 s, 0.4 s]. In this case, the processor 190 may form the 2-tuple using the pressure value and the duration level to obtain the 2-tuple. For example, the duration is 0.2 s, and a corresponding duration level is level 1, and the pressure value is 0.2 N. In this case, the pressure value and the duration level may form a 2-tuple, that is, (0.2, 0.2).

Alternatively, when the 2-tuple is obtained, the pressure level and the duration level may form the 2-tuple. For example, the duration is 0.2 s, and a corresponding duration level is level 1. For example, the pressure value is 0.2 N, and a corresponding pressure level is level 2. In this case, the processor 190 may form a 2-tuple, that is, (2, 1) using the pressure level and the duration level.

Further, how to obtain the 2-tuple may be chosen according to different situations. Obviously, the preset proportion may vary according to a different manner of obtaining the 2-tuple.

Pressure information and/or pressure duration information corresponding to different moments within a period from a time when the user starts to perform a touch control operation to a time when the touch control operation has ended may always change. When any element included in the 2-tuple changes, the 2-tuple changes. In this case, two-dimensional coordinates obtained by means of 2-tuple mapping also change, and a display element indicated by the two-dimensional coordinates may also switch. Optionally, to prompt the user in an operation process of the user in order to enable the user to be clear about a display element currently locked, in this embodiment of the present disclosure, each time when a display element indicated by coordinates on the touchscreen that are obtained after 2-tuple mapping switches, the electronic device may output prompt information using the processor 190. In this way, the user may relatively clearly learn whether a display element needed by the user has been selected. The electronic device may output the prompt information in different manners, for example, may output voice prompt information. For example, possible voice prompt information may be "an icon A is currently selected". Alternatively, for example, the prompt information may be outputted in a manner of changing a display effect of a display element. For example, when a locked display element is a display element A, the electronic device may display the display element A in a highlighted manner using the processor 190, as long as the electronic device can give a prompt to the user.

For example, at a first moment, a 2-tuple that includes a pressure level and a duration level of a touch control operation is (2, 1). For example, $k_1 = X_m F_m = 100$, $k_2 = Y_m/T_m = 100$, and $c_1 = c_2 = 0$. In this case, mapping is performed according to the formula (1) and the formula (2) using the processor 190 to obtain two-dimensional coordinates (200, 100). A display element located at the coordinates is an icon of an application A. In this case, the electronic device may display the icon of the application A in the highlighted manner using the processor 190 and continue to display all other display elements in an original manner, and brightness of the icon of the application A is greater than brightness of another icon. At a second moment, for example, the pressure information of the touch control operation does not change. Although the duration changes, the duration level to which the duration belongs does not change. In this case, the 2-tuple that includes the pressure level and the duration level of the touch control operation is still (2, 1). In this case, mapping is performed according to the formula (1) and the formula (2), and obtained two-dimensional coordinates are still (200, 100). In this case, the display element located at the coordinates is still the icon of the application A, and then the electronic device does not change the previous display manner, that is, continues to display the icon of the application A in the highlighted manner. At a third moment, for example, the 2-tuple that includes the pressure level and the duration level of the touch control operation changes to (2, 3). In this case, the processor 190 performs mapping according to the formula (1) and the formula (2) to obtain two-dimensional coordinates of (200, 300), and the processor 190 determines that a display element located at the coordinates switches to, for example, a key "C" on a virtual keyboard. In this case, the electronic device may display the key "C" on the virtual keyboard in the highlighted manner using the processor 190, and display the icon of the application A in the original display manner again using the processor 190, that is, stop displaying the icon of the application A in the highlighted manner. In this case, the user knows that another display element has been selected. In this manner, the user can learn in a timely manner whether a needed display element has been selected, and then can be very clear about when to end the touch control operation. Therefore, a prompt effect of the electronic device is relatively strong.

It should be noted that, the foregoing value examples are used only to explain the embodiments of the present disclosure, and do not constitute a limitation on the embodiments of the present disclosure. Calculation manners, values, and the like of parameters such as $k_1$, $k_2$, $c_1$, and $c_2$ may vary according to different actual requirements or different presetting. In addition, in the value examples provided in the foregoing, $k_1 = k_2$ and $c_1 = c_2 = 0$ are used as an example. In actual application, $k_1$ and $k_2$ may also be unequal, $c_1$ may be greater than 0, and $c_2$ may also be greater than 0.

Optionally, in response to any touch control operation, the electronic device 100 not only can determine a display element, but also can directly obtain and execute a control instruction corresponding to the determined display element. For example, the electronic device 100 determines, according to a received touch control operation using the processor 190, that a display element that finally corresponds to the touch control operation is the display element A. In this case, the electronic device 100 can directly obtain a control instruction corresponding to the display element A, for example, a control instruction used for invoking an application corresponding to the display element A. In addition, the electronic device 100 can directly execute the control instruction to invoke the application corresponding to the display element A. That is, the user needs to perform a touch control operation only once, and then the electronic device 100 can directly execute a control instruction corresponding to a display element. The user does not need to perform excessive operations. Therefore, operation steps of the user are reduced.

It can be known according to the foregoing description that, at different moments in a process of performing a touch control operation, the touch control operation may correspond to different display elements. In this case, a display element that finally corresponds to a touch control operation may be a display element that corresponds to the touch control operation when the touch control operation ends. That is, before the touch control operation ends, the processor 190 of the electronic device 100 may not need to obtain a control instruction such that a misoperation can be avoided as far as possible. When a touch control operation ends, the electronic device 100 may obtain, using the processor 190, a control instruction corresponding to a display element that corresponds to the touch control operation at this moment. For example, at a moment when an operating body used by the user to perform a touch control operation leaves the touchscreen 131, the electronic device may determine, using the processor 190, that the touch control operation has ended. In this case, the electronic device 100 can determine, using the processor 190, a display element that corresponds to pressure information and pressure duration information at this moment, and obtain a control instruction corresponding to the display element.

Alternatively, in response to any touch control operation, the electronic device 100 can determine a display element. If the user performs another touch control operation on the display element, the electronic device 100 can respond to the other touch control operation using the processor 190 to obtain and execute a control instruction corresponding to the display element. For example, the electronic device 100 determines, using the processor 190, according to a received touch control operation, that a display element that finally corresponds to the touch control operation is the display element A. In this case, the electronic device 100 completes responding to the touch control operation, that is, the touch control operation is used for locking the display element. For example, the user further intends to perform another operation on the display element A. For example, if the user intends to invoke an application corresponding to the display element A, the user may continue to perform a touch control operation on the display element A, for example, may perform a double-tap operation. In this case, by responding to the double-tap operation of the user, the electronic device 100 may obtain a control instruction used for invoking the application corresponding to the display element A, and the electronic device 100 may execute the control instruction to invoke the application corresponding to the display element A.

That is, the touch control operation in the embodiments of the present disclosure may be understood as a pressure touch control operation. The touch control operation may be used for implementing different functions, for example, may be used for instructing the electronic device to directly obtain and execute a control instruction corresponding to a corresponding display element, or may be used for instructing the electronic device to lock a corresponding display element.

In the pressure touch control method described in the foregoing, a display element on the touchscreen 131 can be determined according to the 2-tuple that includes the pressure information and the pressure duration information. The following describes another pressure touch control method in which pressure information and/or pressure duration information may be applied in a different manner.

Figure 3:
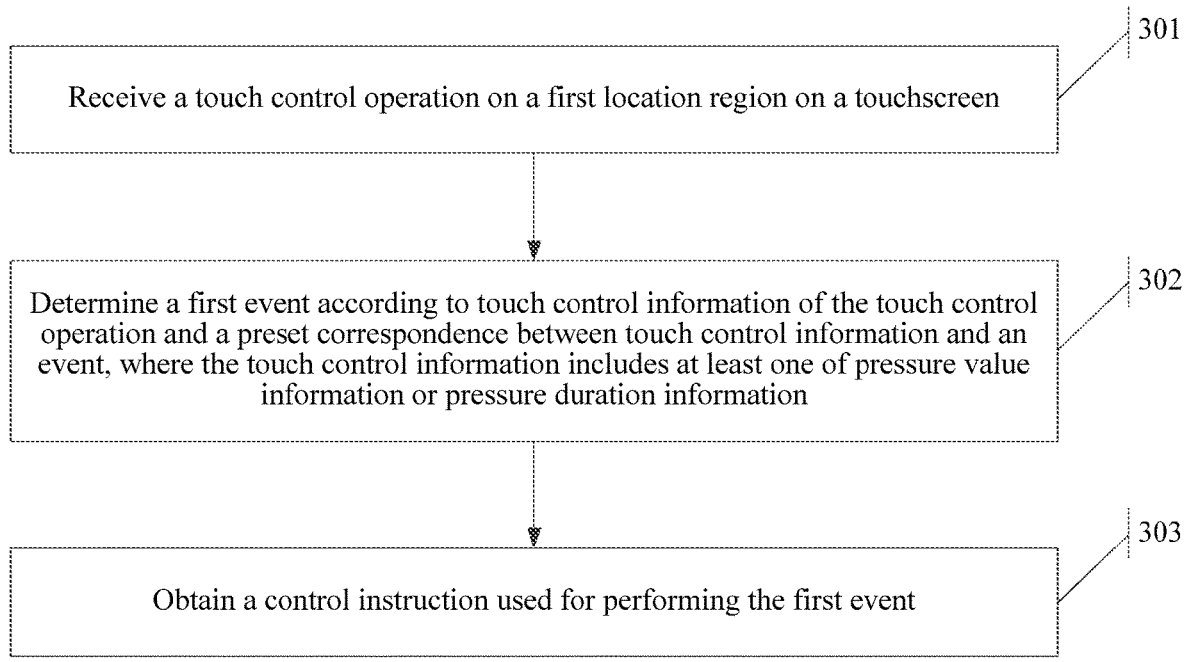
FIG. 3 is a flowchart of a second pressure touch control method according to an embodiment of the present disclosure.

Referring to FIG. 3, a second pressure touch control method is provided. A process of the method is as follows.

Step 301: Receive a touch control operation on a first location region on a touchscreen.

Step 302: Determine a first event according to touch control information of the touch control operation and a preset correspondence between touch control information and an event, where the touch control information includes at least one of pressure value information or pressure duration information.

Step 303: Obtain a control instruction used for performing the first event.

Optionally, an electronic device, such as the electronic device 100 shown in FIG. 1 may pre-store the correspondence between touch control information and an event. For example, the touch control information may include the pressure value information and/or the pressure duration information, and then the electronic device may pre-store a correspondence between a 1-tuple that includes the pressure value information and/or the pressure duration information and an event. In this case, different touch control information may correspond to different events. The 1-tuple may be obtained using the pressure information and/or the pressure duration information. After obtaining the touch control information of the touch control operation using the touchscreen 131, the electronic device may send the touch control information to a processor 190 using the touchscreen 131, and the processor 190 may determine a corresponding first event according to the stored correspondence, and then may obtain a control instruction used for performing the first event to implement a corresponding function. In this manner, a corresponding control instruction may be obtained using only the 1-tuple, an amount of information that needs to be learned is relatively small, and implementation is relatively simple for the electronic device.

Optionally, the electronic device may store a correspondence between a pressure value indicated by the pressure information and an event, that is, the 1-tuple may include a pressure value, or may store a correspondence between a pressure level to which the pressure value indicated by the pressure information belongs and an event, that is, the 1-tuple may include the pressure level. In this way, the electronic device needs to obtain only the pressure information of the touch control operation, to determine a corresponding event.

Alternatively, the electronic device may store a correspondence between duration and an event, that is, the 1-tuple may include the duration, or may store a correspondence between a duration level to which duration belongs and an event, that is, the 1-tuple may include the duration level. In this way, the electronic device needs to obtain only the duration of the touch control operation, to determine a corresponding event.

Alternatively, for example, the 1-tuple may include f*t, where f is a pressure value or a pressure level, and t is duration or a duration level. In this way, after obtaining the pressure information and the pressure duration information, the electronic device may obtain and determine an event. For the event determined in this manner, not only the pressure information is considered, but also the pressure duration information is considered. Therefore the event is relatively accurate.

Optionally, different events included in a correspondence may be used for implementing different functions. For example, some events may be events used for invoking corresponding applications. When the 1-tuple changes, a corresponding event may change, and different events may invoke different applications. For example, an event A may be used for invoking a music application A, and an event B may be used for invoking a game application A. Alternatively, some events may be events used for entering corresponding character information. For example, different 1-tuples may separately correspond to events used for entering characters indicated by character codes of different keys on a virtual input device displayed on the touchscreen 131. For example, the event A may be used for entering a character, that is, a character "A" indicated by a character code of the character "A". Alternatively, some events may be shortcut events. For example, the shortcut events may include an event, where the event needs to be implemented by performing multiple operations, but when the event is bound to one or more keys, the event that originally needs to be implemented by performing multiple operations can be implemented by pressing the one or more keys. For example, the shortcut events in the embodiments of the present disclosure may include an event that is similar to implementation of a function of a shortcut key. For example, the shortcut events may include an event used for making a preset call. Different events may be used for making different calls. Alternatively, the shortcut events may include an event used for sending preset information to a specified contact person. Different events may be used for sending preset information to different specified contact persons, or different events may be used for sending different information to a specified contact person. For example, some events may be used for sending help seeking information to a specified contact person, to implement an alarm function, or the like, or some events may be events that are used for adjusting a display location of a control. For example, some events may be used for adjusting a progress of a multimedia file displayed in a display unit. For example, different 1-tuples may separately correspond to adjustment events used for adjusting different lengths. For example, a progress may be adjusted by adjusting a progress bar of a multimedia file that is currently displayed. Alternatively, for example, a progress may be adjusted by turning pages of a document that is currently displayed. Alternatively, for example, some events may be used for adjusting a display location of an attribute adjustment control displayed on the touchscreen 131. For example, an attribute may include an attribute of the electronic device, such as screen brightness, screen contrast, or volume, or may further include an attribute of a display element displayed on the touchscreen 131, such as a font size of a displayed document. For example, a control used for adjusting a screen display proportion is displayed on the touchscreen 131, and then some events may be used for adjusting a pointing location of a pointer in the control in order to adjust the screen display proportion.

Optionally, if an event is used for adjusting a display location of a control, usually there may be two adjustment directions during adjustment of the control. For example, for a control used for adjusting a volume, the volume may be turned up, or the volume may be turned down. Alternatively, for example, for a control used for adjusting a playing progress of a video file, content to be played may be fast-forwarded, or content to be played may be rewound. In this case, to make the adjustment more accurate, different processing manners may be used.

1. In addition to an adjustment length, an event included in a correspondence may further indicate an adjustment direction. For example, an adjustment length indicated by an event A included in a correspondence is 1, and an adjustment direction is a forward direction. In this case, after a corresponding event is determined according to a 1-tuple, adjustment may be directly performed. A unit of an adjustment length indicated by the event may vary according to different controls. For example, for a video file or an audio file, the unit of the adjustment length may be a time unit such as hour, minute, or second, or for a document-type file, the unit of the adjustment length may be a distance unit such as page or line.

2. The electronic device may determine an adjustment length according to pressure information and/or pressure duration information using the processor 190. In addition, the electronic device may further determine an adjustment direction according to the pressure information using the processor 190. For example, the processor 190 may obtain, according to pressure information of a touch control operation, a direction towards which the touch control operation points. For example, the direction is referred to as a first direction. For example, the processor 190 may determine the first direction as the adjustment direction, or may determine a reverse direction of the first direction as the adjustment direction. The first direction towards which the touch control operation points may be obtained according to the pressure information of the touch control operation in different manners.

First manner: The touch control operation is a sliding touch control operation, that is, the touch control operation has a sliding track. In this case, the electronic device may directly determine the first direction according to the sliding track using the processor 190.

Second manner: The touch control operation is a pressing touch control operation, that is, when performing the touch control operation, the user does not move the operating body, and then the touch control operation has no sliding track. In this case, the electronic device may collect pressure values of points in a region on which the operating body used by the user to perform the touch control operation touches the touchscreen 131, and the electronic device may determine, using the processor 190 and according to pressures that the points are under, whether the user tends towards a movement direction.

Figure 4:
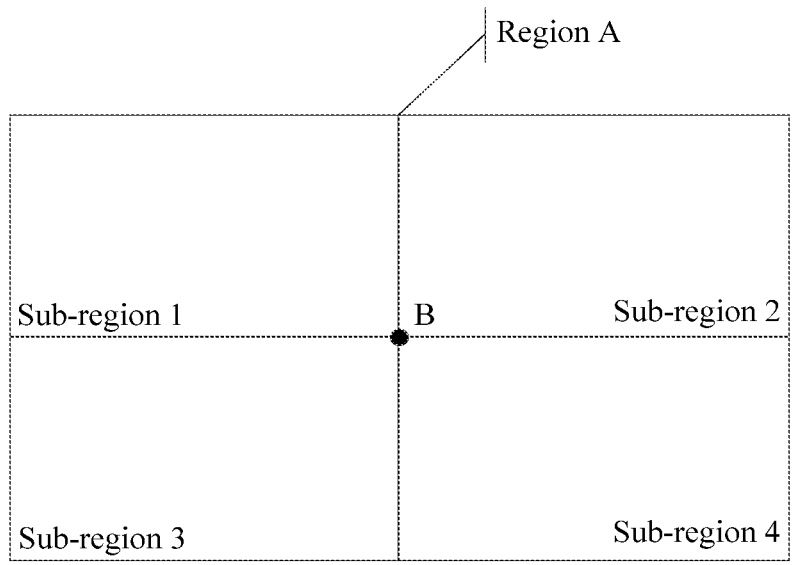
FIG. 4 is a schematic diagram of a region in which an operating body touches a touchscreen according to an embodiment of the present disclosure.

For example, as shown in FIG. 4, a region A in FIG. 4 is a region on which a finger of the user touches the touchscreen 131 when the user performs a touch control operation. The touch region is divided into four sub-regions, which are respectively a sub-region 1, a sub-region 2, a sub-region 3, and a sub-region 4 in FIG. 4. The electronic device may collect pressure values of points in the four sub-regions. For example, the electronic device may separately calculate average pressure values of the four sub-regions using the processor 190. For example, the average pressure value of the sub-region 1 is greater than each of the average pressure values of the other three four sub-regions, and then the electronic device may determine, using the processor 190, that the first direction is a direction that points towards the sub-region 1 from a central point (a point B in FIG. 4) of the touch region. The touch region in FIG. 4 is in a rectangular shape, and this is used as an example. In actual application, the touch region may also be in an irregular shape, as long as processing is performed using the methods in the embodiments of the present disclosure. That is, if the user does not move the operating body, this embodiment of the present disclosure provides a possible manner of determining a direction of a touch control operation such that a display location of a control can be adjusted more accurately.

For example, a correspondence stored in the electronic device is a correspondence between a pressure level and an event. For example, at a moment, the electronic device determines, using the processor 190, that the pressure level is 1, a corresponding event is an event used for adjusting a playing progress of a video file displayed on the touchscreen by one minute, and a direction towards which a touch control operation points and that is obtained by the processor 190 using pressure information is a rightwards direction, that is, a forward direction. In this case, the electronic device may adjust, using the processor 190, the playing progress of the video file towards the forward direction by one minute. This is equivalent to fast-forwarding the video file. Currently, during adjustment of a progress bar, the user usually performs the adjustment in a manner of manually dragging the progress bar. Manual locating is not very accurate, and it is difficult to adjust to a location that is exactly wanted. In the manner provided in the embodiments of the present disclosure, the user does not need to manually drag the progress bar, and the electronic device automatically performs adjustment such that an adjustment result may be more accurate.

Similarly, it can be known according to the foregoing description that, at different moments in an execution process, one touch control operation may correspond to different touch control information, and then may correspond to different events. In this case, the electronic device may perform an event that finally corresponds to the touch control operation. The event that finally corresponds to the touch control operation may be an event that corresponds to the touch control operation when the touch control operation ends. That is, before a touch control operation ends, the processor 190 of the electronic device may not need to obtain and query a correspondence to determine an event, or although the processor 190 queries a corresponding event, the processor 190 may not need to obtain a control instruction used for performing the event. In this way, workload of the electronic device may be reduced, and a misoperation may be avoided as far as possible. When a touch control operation ends, the electronic device may obtain, using the processor 190, an event corresponding to touch control information of the touch control operation at this moment, for example, a moment when an operating body used for performing the touch control operation leaves the touchscreen 131. The electronic device may determine, using the processor 190, that the touch control operation has ended, and then the electronic device may determine, using the processor 190, an event that corresponds to pressure information and/or pressure duration information at this moment, and obtain a control instruction used for performing the event.

The foregoing describes different pressure touch control methods, by means of the foregoing methods, a user needs to perform a touch control operation only in a location on a touchscreen 131 to implement a function that the user intends to implement. The user does not need to determine a needed display element and then specially perform an operation on the display element. Therefore, operation steps of the user are reduced, and device intelligence is increased.

Figure 5:
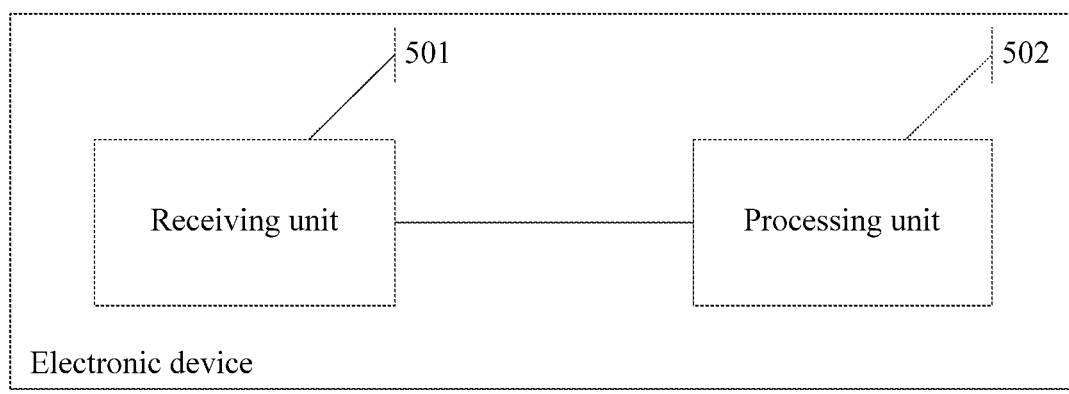
FIG. 5 is a structural block diagram of an electronic device according to an embodiment of the present disclosure.

Referring to FIG. 5, another electronic device is provided. The electronic device may include a receiving unit 501 and a processing unit 502.

In an embodiment, a physical device corresponding to the receiving unit 501 may be the touchscreen 131 in FIG. 1, and a physical device corresponding to the processing unit 502 may be the processor 190 in FIG. 1.

The electronic device may be configured to execute the methods in FIG. 2 and FIG. 3, for example, may be the electronic device described in the foregoing. Therefore, for functions and the like implemented by the units in the electronic device, refer to the description in the foregoing method. Details are not described.

In this embodiment of the present disclosure, when a user performs multiple touch control operations on a same location region on the receiving unit 501, the multiple touch control operations may correspond to different display elements, or a correspondence between pressure information and/or pressure duration information and an event may be preset. That is, when the user performs the operations at a same location, different display elements may be located, or the operations may correspond to different events such that the electronic device may respond differently. In this way, the user may perform the operations at one location region to select different display elements or implement different functions, and the user does not need to first find a corresponding display element on the touchscreen and then perform an operation. As long as pressure value information is different and/or pressure duration information is different when the user performs a touch control operation, the electronic device may respond differently, improving the operation efficiency, and reducing burden of the user. For example, when holding the electronic device in a single hand, the user needs to perform a touch control operation only in a location on the touchscreen of the electronic device using the hand in which the electronic device is held to select a needed display element or enable the electronic device to perform an event without performing an operation using both hands such that an operation process of the user is simpler and more convenient.

In the present disclosure, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected according to actual needs to achieve the embodiments of the present disclosure.

Functional the units in the embodiments of the present disclosure may be integrated into one processing unit, or each of the units may be an independent physical module.

When the integrated unit is implemented in the form of a software functional unit and sold or used as an independent product, the integrated unit may be stored in a computer-readable storage medium. Based on such an understanding, all or a part of technical solutions of the present disclosure may be implemented in a form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely used to describe the technical solutions of the present disclosure. The foregoing embodiments are merely intended to help understand the method of the embodiments of the present disclosure, and shall not be construed as a limitation on the embodiments of the present disclosure. Any variation or replacement readily figured out by a person skilled in the art shall fall within the protection scope of the embodiments of the present disclosure.

What is claimed is:

1. A pressure touch control method implemented by an electronic device having a touchscreen, the method comprising:
   receiving, on a same location on the touchscreen, a first touch control operation and a second touch control operation;
   obtaining first two-dimensional coordinates based on mapping a first 2-tuple comprising first pressure value information and first pressure duration information of the first touch control operation, wherein the first two-dimensional coordinates correspond to a first display element;

obtaining second two-dimensional coordinates based on mapping a second 2-tuple comprising second pressure value information and second pressure duration information of the second touch control operation, wherein the second two-dimensional coordinates correspond to a second display element;

executing a first control instruction corresponding to the first display element when the first touch control operation is received; and executing a second control instruction corresponding to the second display element when the second touch control operation is received.

2. The method of claim 1, wherein mapping the first 2-tuple and mapping the second 2-tuple comprises mapping according to the following formulas:

$$x=k_1f+c_1; \text{ and}$$

$$y=k_2t+c_2,$$

wherein both the $k_1$ and the $k_2$ are coefficients of proportionality, wherein both the $c_1$ and the $c_2$ are constants, wherein the x indicates a horizontal coordinate on the touchscreen, wherein the y indicates a vertical coordinate on the touchscreen, wherein the f indicates a pressure value, and wherein the t indicates a duration.

3. The method of claim 1, wherein before executing the second control instruction, the method further comprises outputting prompt information in response to a change of the first two-dimensional coordinates to the second two-dimensional coordinates, and wherein the change is in response to changes in pressure value and duration.

4. The method of claim 1, wherein before executing the second control instruction, the method further comprises outputting prompt information in response to a change of the first two-dimensional coordinates to the second two-dimensional coordinates, and wherein the change is in response to changes in pressure value.

5. The method of claim 1, wherein before executing the second control instruction, the method further comprises outputting prompt information in response to a change of the first two-dimensional coordinates to the second two-dimensional coordinates, and wherein the change is in response to changes in duration.

6. An electronic device, comprising:
a processor; and
a touchscreen coupled to the processor and configured to:
receive, on a same location of the touchscreen, a first touch control operation and a second touch control operation;
send operation information of the touch control operations to the processor,
wherein the processor is configured to:
determine first two-dimensional coordinates based on mapping a first 2-tuple comprising first pressure value information and first pressure duration information of the first touch control operation, wherein the first two dimensional coordinates correspond to a first display element;
determine second two-dimensional coordinates based on mapping a second 2-tuple comprising second pressure value information and second pressure duration information of the second touch control operation wherein the second two-dimensional coordinates correspond to a second display element;
execute a first control instruction corresponding to the first display element when the first touch control operation is received; and
execute a second control instruction corresponding to the second display element when the second touch control operation is received.

7. The electronic device of claim 6, wherein the processor is further configured to map the first 2-tuple and the second 2-tuple according to the following formulas:

$$x=k_1f+c_1; \text{ and}$$

$$y=k_2t+c_2,$$

wherein both the $k_1$ and the $k_2$ are coefficients of proportionality, wherein both the $c_1$ and the $c_2$ are constants, wherein the x indicates a horizontal coordinate on the touchscreen, wherein the y indicates a vertical coordinate on the touchscreen, wherein the f indicates a pressure value, and wherein the t indicates a duration.

8. The electronic device of claim 6, wherein before executing the second control instruction, the processor is further configured to output prompt information in response to a change of the first two-dimensional coordinates to the second two-dimensional coordinates, and wherein the change is in response to changes in pressure value or duration.

9. The electronic device of claim 6, wherein before executing the second control instruction, the processor is further configured to output prompt information in response to a change of the first two-dimensional coordinates to the second two-dimensional coordinates, and wherein the change is in response to changes in pressure value and duration.

10. A pressure touch control method implemented by an electronic device having a touchscreen, the method comprising:
receiving a first touch control operation on a region on the touchscreen;
obtaining first pressure value information and first pressure duration information corresponding to the first touch control operation;
obtaining first two-dimensional coordinates corresponding to the first touch control operation by mapping a first 2-tuple comprising the first pressure value information and the first pressure duration information to the first two-dimensional coordinates;
determining a first display element corresponding to the first two-dimensional coordinates on the touchscreen; and
executing a first control instruction corresponding to the first display element.

11. The method of claim 10, wherein mapping the first 2-tuple comprises mapping according to the following formulas:

$$x=k_1f+c_1; \text{ and}$$

$$y=k_2t+c_2,$$

wherein both the $k_1$ and the $k_2$ are coefficients of proportionality, wherein both the $c_1$ and the $c_2$ are constants, wherein the x indicates a horizontal coordinate on the touchscreen, wherein the y indicates a vertical coordinate on the touchscreen, wherein the f indicates a pressure value, and wherein the t indicates a duration.

12. The method of claim 10, wherein before executing the first control instruction, the method further comprises outputting first prompt information corresponding to the first display element.

13. The method of claim 10 further comprising:
   receiving a second touch control operation on the region on the touchscreen;
   obtaining second pressure value information and second pressure duration information corresponding to the second touch control operation;
   obtaining second two-dimensional coordinates corresponding to the second touch control operation by mapping a second 2-tuple comprising the second pressure value information and the second pressure duration information to the second two-dimensional coordinates; and
   determining a second display element corresponding to the second two-dimensional coordinates on the touchscreen.

14. The method of claim 13 further comprising outputting second prompt information corresponding to the second display element.

15. The method of claim 14 further comprising executing a second control instruction corresponding to the second display element.

* * * * *